US012807349B2

(12) United States Patent
Sikora et al.

(10) Patent No.: US 12,807,349 B2
(45) Date of Patent: Nov. 24, 2026

(54) STRAPPING TOOL

(71) Applicant: Golden Bear LLC, Columbus, OH (US)

(72) Inventors: Joshua Robert Sikora, Columbus, OH (US); Pavlo Vsevirovich Barlasov, San Jose, CA (US); Charles Russell Patzer, Columbus, OH (US)

(73) Assignee: Golden Bear LLC, Columbus, OH (US)

( * ) Notice: Subject to any disclaimer, the term of this patent is extended or adjusted under 35 U.S.C. 154(b) by 129 days.

(21) Appl. No.: 18/657,724

(22) Filed: May 7, 2024

(65) Prior Publication Data

US 2024/0375802 A1 Nov. 14, 2024

Related U.S. Application Data

(60) Provisional application No. 63/464,663, filed on May 8, 2023.

(51) Int. Cl.

| | |
|---|---|
| ***B65B 13/30*** | (2006.01) |
| ***B65B 13/18*** | (2006.01) |
| ***H01R 43/04*** | (2006.01) |
| ***H01R 43/042*** | (2006.01) |
| ***H01R 43/048*** | (2006.01) |

(52) U.S. Cl.

CPC .......... *B65B 13/305* (2013.01); *B65B 13/187* (2013.01); *H01R 43/04* (2013.01); *H01R 43/0428* (2013.01); *H01R 43/048* (2013.01)

(58) Field of Classification Search

CPC .... B65B 13/025; B65B 13/305; B65B 13/345

See application file for complete search history.

(56) References Cited

U.S. PATENT DOCUMENTS

| | | | | |
|---|---|---|---|---|
| 2,386,153 A | | 10/1945 | Watt et al. | |
| 2,693,218 A | * | 11/1954 | Freedom | H01R 43/042 140/113 |
| 3,144,888 A | | 8/1964 | Palmer | |
| 3,329,178 A | * | 7/1967 | Plunkett | B65B 13/188 140/93.4 |
| 3,481,373 A | * | 12/1969 | Blagojevich | B25B 27/10 140/113 |

(Continued)

FOREIGN PATENT DOCUMENTS

| | | |
|---|---|---|
| EP | 1582463 A2 | 10/2005 |
| KR | 20090055279 A | 6/2009 |
| WO | 2015162171 A | 10/2015 |

*Primary Examiner* — Jared O Brown

(74) *Attorney, Agent, or Firm* — The Law Office of Patrick F. O'Reilly III, LLC

(57) ABSTRACT

A strapping tool including an external power source; a drivetrain assembly operatively coupled to the external power source; a sealing assembly, the sealing assembly comprising at least one jaw member, the drivetrain assembly operatively coupling the at least one jaw member to the external power source, and the at least one jaw member of the sealing assembly configured to crimp or notch a strapping seal member so as to secure a piece of strapping around a package or bundle of items. The drivetrain assembly is configured to return the at least one jaw member to an open position without sending or receiving a control signal from a control board.

10 Claims, 14 Drawing Sheets

(56) References Cited

U.S. PATENT DOCUMENTS

| | | | | |
|---|---|---|---|---|
| 3,552,450 | A * | 1/1971 | Plunkett | B65B 13/345 140/93.4 |
| 3,654,033 | A | 4/1972 | Angarola et al. | |
| 3,799,835 | A | 3/1974 | Gilmore | |
| 4,027,609 | A | 6/1977 | Kerr | |
| 4,096,019 | A | 6/1978 | Lehmann | |
| 4,412,498 | A | 11/1983 | Scholl | |
| 4,449,464 | A | 5/1984 | Porter | |
| 4,871,414 | A | 10/1989 | Niedrig | |
| 5,476,569 | A | 12/1995 | Harada | |
| 5,526,761 | A | 6/1996 | Mulcahey et al. | |
| 5,632,851 | A | 5/1997 | Young | |
| 5,653,095 | A | 8/1997 | Stamm | |
| 5,942,061 | A | 8/1999 | Figiel et al. | |
| 5,954,899 | A | 9/1999 | Figiel et al. | |
| 6,332,306 | B1 | 12/2001 | Finzo et al. | |
| 6,895,733 | B2 | 5/2005 | Nix | |
| 6,957,678 | B2 | 10/2005 | Scholl et al. | |
| 6,966,255 | B1 | 11/2005 | Crittenden | |
| 7,073,431 | B1 | 7/2006 | Chen | |
| 7,275,567 | B2 | 10/2007 | Ishii et al. | |
| 7,428,866 | B2 | 9/2008 | Reiche | |
| 8,578,997 | B2 | 11/2013 | Rauch | |
| 9,272,799 | B2 | 3/2016 | Figiel et al. | |
| 9,745,090 | B2 | 8/2017 | Haberstroh et al. | |
| 10,577,137 | B2 | 3/2020 | Nasiatka et al. | |
| 10,745,158 | B2 | 8/2020 | Sikora et al. | |
| 2004/0144146 | A1 * | 7/2004 | Amherd | B21D 39/048 72/21.3 |
| 2008/0024077 | A1 * | 1/2008 | Bernier | B25B 27/10 361/29 |
| 2009/0013656 | A1 | 1/2009 | Nasiatka et al. | |
| 2011/0056392 | A1 | 3/2011 | Neeser et al. | |
| 2011/0083596 | A1 | 4/2011 | Asao et al. | |
| 2012/0060735 | A1 | 3/2012 | Dickerson | |
| 2012/0085274 | A1 | 4/2012 | Bardh et al. | |
| 2012/0180606 | A1 | 7/2012 | Armes | |
| 2013/0085053 | A1 * | 4/2013 | Figiel | B65B 13/025 493/84 |
| 2014/0007781 | A1 | 1/2014 | Sikora et al. | |
| 2014/0048298 | A1 | 2/2014 | Fuchs et al. | |
| 2014/0290179 | A1 | 10/2014 | Keller | |
| 2015/0210411 | A1 | 7/2015 | Finzo et al. | |
| 2015/0321777 | A1 | 11/2015 | Nasiatka et al. | |
| 2016/0016682 | A1 | 1/2016 | Boss et al. | |
| 2017/0008652 | A1 | 1/2017 | Figiel et al. | |
| 2017/0174374 | A1 | 6/2017 | Figiel et al. | |
| 2018/0127124 | A1 * | 5/2018 | Sikora | B65B 57/02 |
| 2019/0176207 | A1 * | 6/2019 | Thorson | G05B 19/232 |
| 2019/0256233 | A1 | 8/2019 | Sikora et al. | |
| 2022/0119140 | A1 * | 4/2022 | Sikora | F04B 1/0426 |
| 2026/0097475 | A1 * | 4/2026 | Heep | B25B 27/10 |

* cited by examiner

SECTION C-C

SECTION B-B

DETAIL E

DETAIL D

SECTION C-C

SECTION B-B

DETAIL E

DETAIL D

SECTION C-C

SECTION B-B

DETAIL E

DETAIL D

DETAIL A

DETAIL A

STRAPPING TOOL

CROSS-REFERENCE TO RELATED APPLICATIONS

This patent application claims priority to, and incorporates by reference in its entirety, U.S. Provisional Patent Application No. 63/464,663, entitled "Strapping Tool", filed on May 8, 2023.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a strapping tool. More particularly, the invention relates to a strapping tool that is configured to notch or crimp a strapping seal member that secures end portions of the piece of strapping to one another.

2. Background

Various tools are known in the packaging art for performing numerous functions related to the manipulation of strapping, which is commonly used as a closing mechanism for packages, and as a convenient means for easily attaching two objects to one another (e.g., attaching a box to a pallet). The tools are used to cut the seals on steel or poly strapping systems so that the strap is held tight in tension. Strapping often is used to consolidate several items for shipping purposes or holding positions of various components. Some of these conventional tools are powered directly from a centralized system, such as a building electrical system or a central pneumatic system. That is, conventional tools of this type usually require power sources that are not an integrated part of the unit (e.g., for a pneumatic tool, a remote air compressor is required). The aforementioned types of conventional packaging tools have numerous limitations and drawbacks. For example, these conventional tools are not able to be used where a power source is unavailable. Also, these conventional tools are often overly heavy and cumbersome to use.

Therefore, what is needed is a strapping tool that is convenient for virtually any application where other power sources are unavailable. In addition, there is a need for a strapping tool that utilizes fewer and simpler components than conventional tools so as to reduce the overall complexity of the tool, and thereby provide a more cost effective alternative for performing strapping operations.

BRIEF SUMMARY OF EMBODIMENTS OF THE INVENTION

Accordingly, the present invention is directed to a strapping tool that substantially obviates one or more problems resulting from the limitations and deficiencies of the related art.

In accordance with one or more embodiments of the present invention, there is provided a strapping tool. The strapping tool includes an external power source; a drivetrain assembly operatively coupled to the external power source; a sealing assembly, the sealing assembly comprising at least one jaw member, the drivetrain assembly operatively coupling the at least one jaw member to the external power source, and the at least one jaw member of the scaling assembly configured to crimp or notch a strapping seal member and/or strapping so as to secure a piece of strapping around a package or bundle of items. In these one or more embodiments, the drivetrain assembly is configured to return the at least one jaw member to an open position without sending or receiving a control signal from a control board.

In a further embodiment of the present invention, the at least one jaw member is configured to return to the open position without being driven by the external power source.

In yet a further embodiment, the drivetrain assembly further comprises a transitional coupling, and the sealing assembly further comprises a screw shaft selectively rotatably coupled to the transitional coupling and threadingly engaged with a nut-pusher component, the nut-pusher component comprising a bevel that includes a working bevel portion and an idle bevel portion, and the nut-pusher component being pressed upwardly by one or more springs; and at least one cam follower that is pressed to the bevel of the nut-pusher component by links, the cam follower being coupled to the at least one jaw member.

In still a further embodiment, the sealing assembly further comprises at least one guide plate, at least one stationary jaw spacer, and at least one shoulder screw, the at least one jaw member being pivotally mounted on the at least one shoulder screw, and the shoulder screw securing the at least one jaw member between the at least one guide plate and the at least one stationary jaw spacer.

In yet a further embodiment, the screw shaft is in a form of a ball-screw shaft and the nut-pusher component is in a form of a ball-nut-pusher component.

In still a further embodiment, the sealing assembly further comprises at least one guide plate, at least one clutch lever, and a clutch lifter; and the nut-pusher component further comprises a lower protruded element and an upper protruded element; and the at least one clutch lever is pivotally mounted on the at least one guide plate, one end of the at least one clutch lever interacting with the lower protruded element or the upper protruded element of the nut-pusher component, and another end of the at least one clutch lever interacting with a slot on a lower section of the clutch lifter, and the nut-pusher component, the at least one clutch lever, and the clutch lifter are configured such that the at least one clutch lever is pushing the clutch lifter downward in an upper position of the nut-pusher component, and the at least one clutch lever is pushing the clutch lifter upward in a lower position of the nut-pusher component.

In yet a further embodiment, the sealing assembly further comprises a pair of balls pushed toward each other by springs and pressed against opposed vertical surfaces of the clutch lifter by the springs; a clutch plate being in contact with the transitional coupling and with an upper portion of the clutch lifter; and end switch operated by one or more extended portions of the clutch plate so that the end switch is in the "ON" state when the clutch plate and the transitional coupling is in the lower position, and the end switch is in the "OFF" state when the clutch plate and the transitional coupling is in the upper position. When the pair of balls are pushed toward each other by the springs and press against bevel surfaces of the clutch lifter by means of the springs, the pair of balls provide an additional vertical movement of the clutch lifter, thereby completely disengaging the screw shaft from the external power source so that the screw shaft is then free, and the nut-pusher component, as a result of being pressed upward by springs, starts to move upward, thereby rotating the free screw shaft until the lower protruded element of the nut-pusher component contacts the clutch lever so as to bring the clutch plate and the transitional coupling in the lower position where the transitional coupling is able to rotatably engage the screw shaft, thereby connecting the sealing assembly to the external power source, whereby the end switch is now in the "ON" state and the sealing assembly is ready for the new cycle.

In still a further embodiment, the drivetrain assembly further comprises a transitional coupling, and the sealing assembly further comprises a screw shaft selectively rotatably coupled to the transitional coupling and threadingly engaged with a nut-pusher component; at least one linkage member coupling the at least one jaw member to the nut-pusher component by means of a linkage frame member; and a handle member operatively coupled to the transitional coupling, the handle member configured to displace the transitional coupling between an engaged position where the screw shaft is engaged with a drive shaft of the external power source and a disengaged position where the screw shaft is disengaged from the drive shaft of the external power source. When a user of the strapping tool lifts the handle member, the transitional coupling is displaced into the disengaged position, whereby the drive shaft of the external power source is disengaged from the screw shaft so that the screw shaft is able to rotate freely and independently from the drive shaft.

In yet a further embodiment, the sealing assembly further comprises at least one spring disposed above the transitional coupling for biasing the transitional coupling into the engaged position where the screw shaft is engaged with the drive shaft of the external power source. When the user of the strapping tool releases the handle member, the transitional coupling is displaced into the engaged position facilitated by a spring force exerted on the transitional coupling by the at least one spring.

In still a further embodiment, the external power source is capable of being selectively engaged with, and disengaged from, the sealing assembly.

In yet a further embodiment, the external power source comprises one of the following: (i) an electric drill; (ii) a pneumatic drill; (iii) a right-angle grinder; and (iv) a circular saw.

In still a further embodiment, the external power source is battery-powered.

In yet a further embodiment, the external power source comprises a battery-powered electric drill.

In still a further embodiment, the control board is in a form of a printed circuit board configured to control operation of the battery-powered electric drill.

In yet a further embodiment, the drivetrain assembly further comprises a direct drive coupling, and the sealing assembly further comprises a screw shaft rotatably coupled to the direct drive coupling and threadingly engaged with a nut-pusher component; and at least one linkage member coupling the at least one jaw member to the nut-pusher component by means of a linkage frame member. In this further embodiment, the drivetrain assembly is configured to return the at least one jaw member to the open position when a motor of the external power source is reversed based upon a signal outputted by a torque sensing device or position sensing device.

In still a further embodiment, the sensing device is in a form of: (i) a torque sensor configured to detect the torque outputted by the motor, or (ii) position switch or limit switch configured to detect the position of a component of the sealing assembly.

In accordance with one or more embodiments of the present invention, there is provided a strapping tool. The strapping tool includes an external power source with a motor; a drivetrain assembly operatively coupled to the external power source; a power motor control board configured to control the motor of the external power source; a sealing assembly, the sealing assembly comprising at least one jaw member, the drivetrain assembly operatively coupling the at least one jaw member to the external power source, and the at least one jaw member of the sealing assembly configured to crimp or notch a strapping seal member and/or strapping so as to secure a piece of strapping around a package or bundle of items; and a sensing device configured to detect a torque outputted by the motor or a position of a component of the scaling assembly and output a signal based on the detected torque or position. In these one or more embodiments, the power motor control board is configured to reverse a rotational direction of the motor based upon the signal outputted by the sensing device so as to return the at least one jaw member to an open position.

In a further embodiment of the present invention, the sensing device is in a form of a torque sensor configured to detect the torque outputted by the motor.

In yet a further embodiment, the sensing device is in a form of a position switch or limit switch configured to detect the position of the component of the scaling assembly.

In still a further embodiment, the at least one jaw member is configured to return to the open position by being driven by the motor of the external power source.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 4:
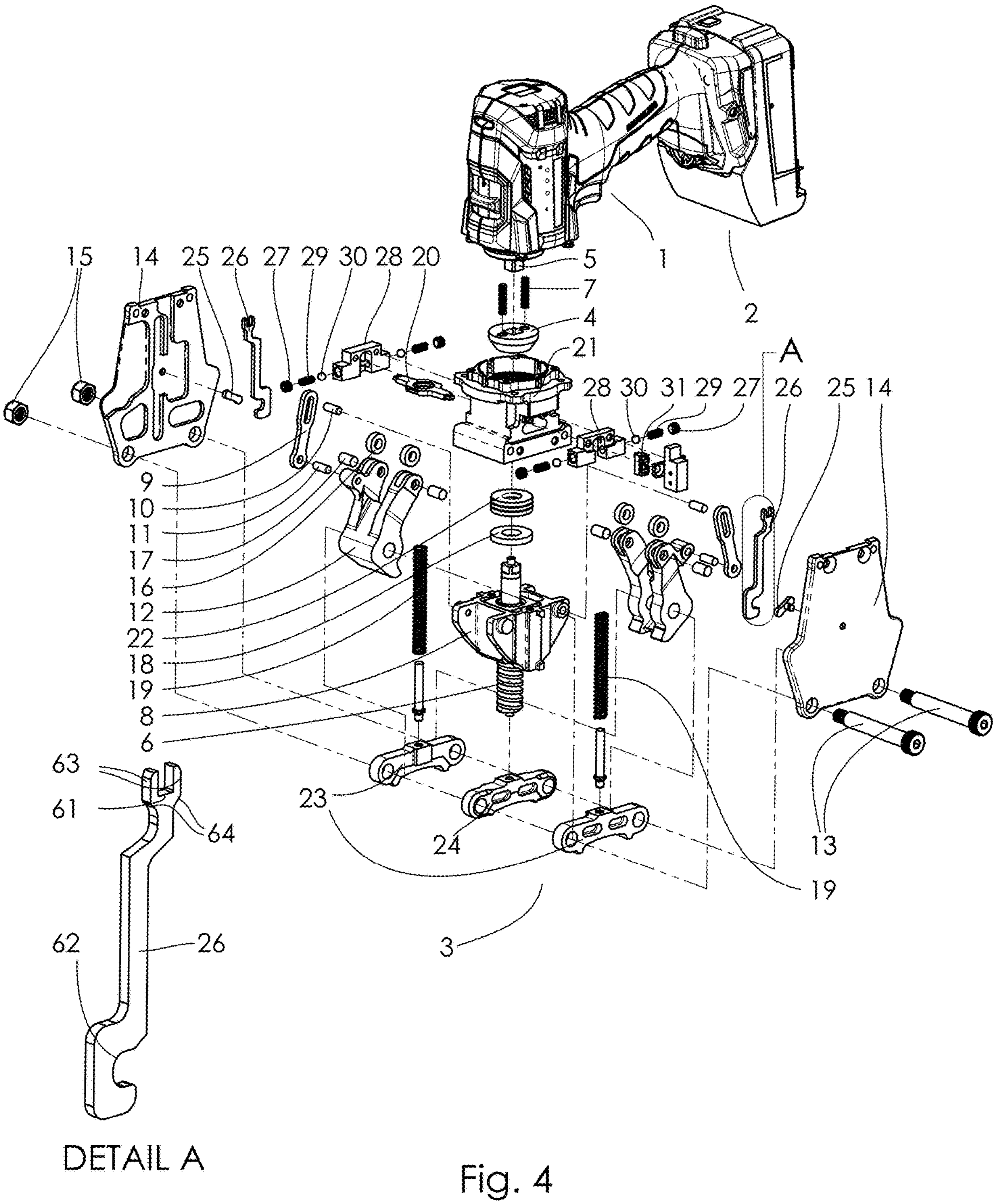
FIG. 4 is an exploded perspective view of the strapping tool of FIG. 1.

A first illustrative embodiment of a strapping tool is illustrated in FIGS. 1-7. An exploded perspective view of the assemblies that form the strapping tool is depicted in FIG. 4. In the illustrative embodiment, the strapping tool is in a form of a crimp-type or notch-type sealer with an external power source (e.g., battery-powered drill 1). In particular, the sealer of the first illustrative embodiment is configured to crimp or notch a strapping seal member and/or strapping so as to secure a piece of strapping with strapping portions around a package or bundle of items. In particular, the first illustrated embodiment depicts an 18-volt battery-powered sealer. While the external power source of the first embodiment is in the form of a battery-powered drill 1, those of ordinary skill in the art will appreciate that other suitable external power sources may be substituted for the drill 1. For example, an alternative external power source in the form of a 120-volt AC drill or pneumatic drill could be used. Also, a suitable circular saw or grinder could be used to power the crimp-type sealer. In general, the external power required to drive the strapping tool could be supplied by a variety of different sources including, but not limited to, battery, air, alternating-current (AC) electricity, hydraulic or fluid power.

In the first illustrative embodiment, the strapping tool is in a form of a an externally-powered sealing tool for securing a seal member onto overlapped end portions of a strap material, and includes at least a tool head and an external power source operatively coupled thereto, the external power source being attached to the sealing tool in a substantially immovable manner. According to another aspect, the sealing tool includes a power transfer subassembly operatively coupled to an external power source, the power transfer subassembly configured to transfer a motive power from an external power source to the sealing tool; and a coupling member configured to couple the sealing tool to the external power source during the sealing stroke and uncouple the scaling tool from the external power source during the bringing of the sealing tool to its initial state. Advantageously, the automated non-powered return of the sealer to the initial state increases the number of cycles on one single charge, thereby conserving energy. In the first illustrative embodiment, the powertrain of the externally-powered sealer operates in one direction for closing and opening the sealer.

Figure 1:
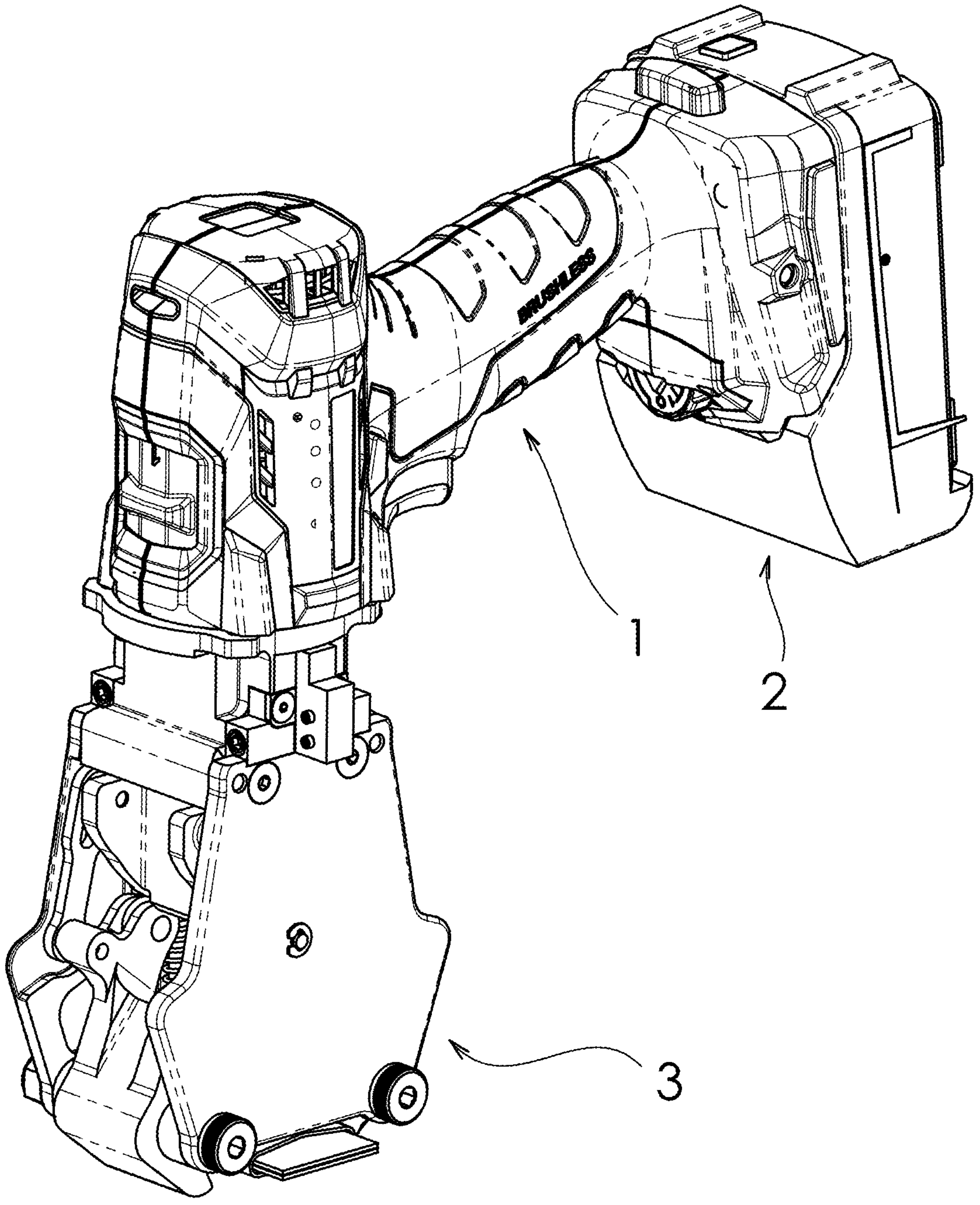
FIG. 1 is a perspective view of a strapping tool, according to a first illustrative embodiment of the invention.

As best shown in FIGS. 1 and 4, the external power source of the first embodiment comprises a drill 1 that is powered by a battery pack 2 (e.g., an 18-volt lithium battery pack). For example, suitable battery-powered drills that could be used for drill 1 are Milwaukee® M18 Fuel Series drill model nos. 2601-20, 2610-20, 2601-22, and 2610-24. The battery-powered drill 1 is operatively coupled to the sealer assembly 3 by means of a transition coupling 4 (i.e., attachment means). The transition coupling 4 is configured to transmit power from the drill 1 to the sealer assembly 3. Referring to FIG. 1, it can be seen that the external power source (i.e., battery-powered drill 1) is attached to the sealer 3 at a predetermined acute angle of approximately 90° that is configured to facilitate the efficiency and ergonomic characteristics of the externally-powered sealer. In another embodiment, the external power source (i.e., battery-powered drill 1) can be attached to the sealer 3 at an acute angle lying in the range from approximately 60 degrees to approximately 80 degrees (or in the range from 60 degrees to 80 degrees).

Figures 2A, 2B:
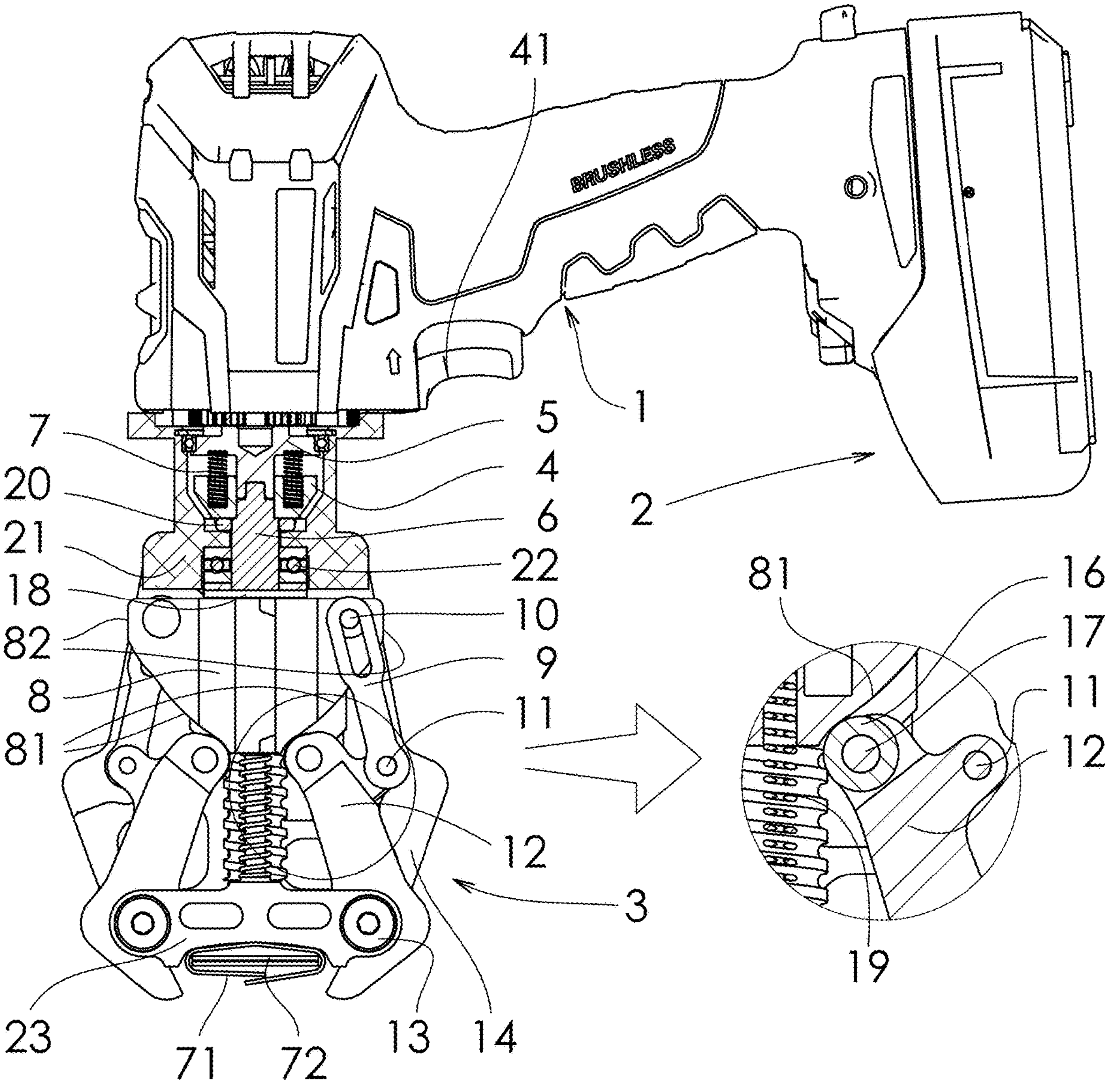
FIG. 2*a* is a side elevational view of the strapping tool of FIG. 1, wherein the jaws of the strapping tool are depicted in an initial open state with a guide plate of the strapping tool removed for ease of illustration.
FIG. 2*b* is an enlarged partial side view of the sealing assembly of the strapping tool depicted in FIG. 2*a*, wherein the cam follower at the upper end of one of the moving jaws is depicted.
Figure 3:
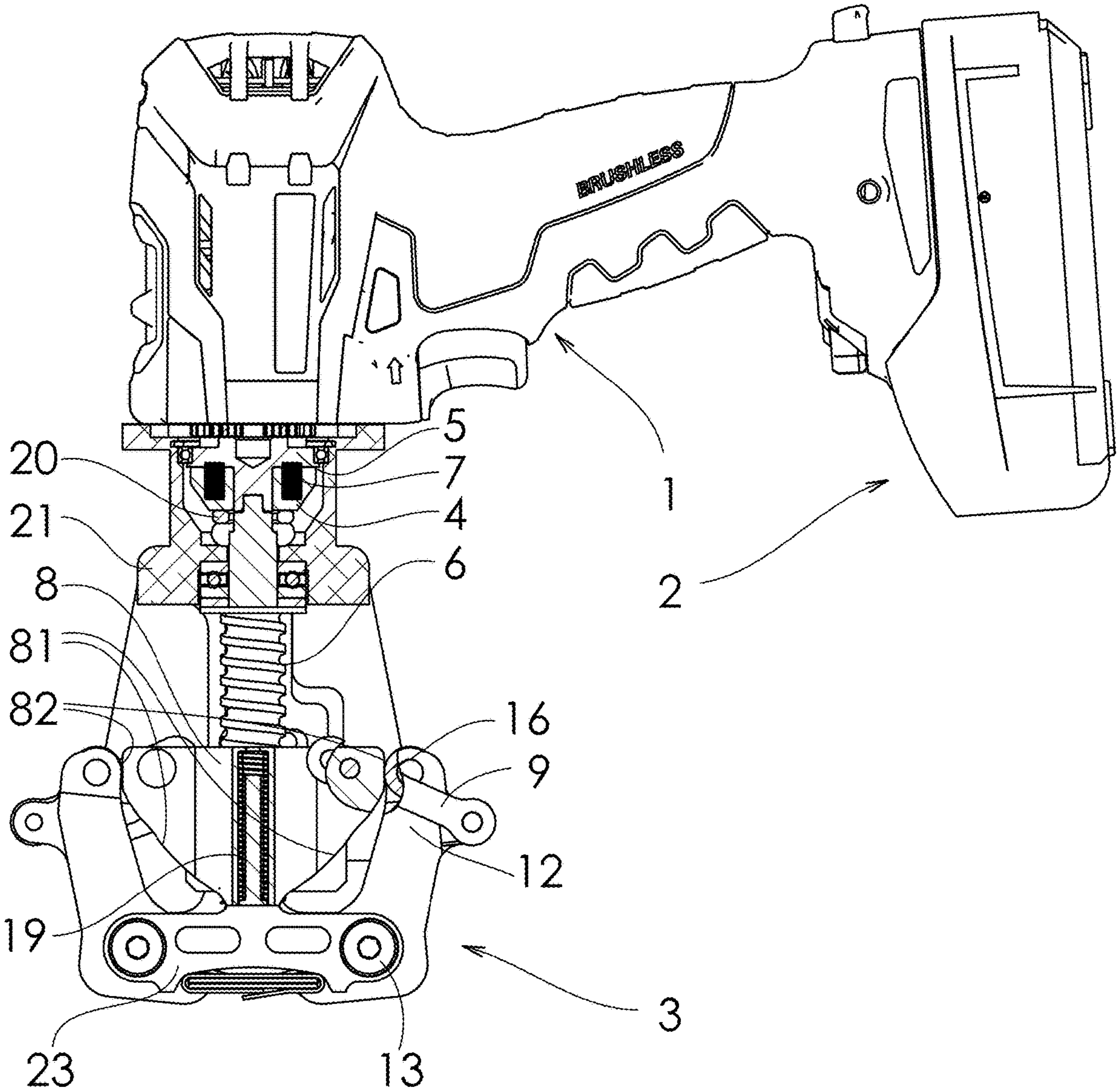
FIG. 3 is another side elevational view of the strapping tool of FIG. 1, wherein the jaws of the strapping tool are depicted in a closed state for crimping or notching the seal member with a guide plate of the strapping tool removed for ease of illustration.

Also, referring to FIGS. 2*a* and 4, it can be seen that, in the initial state, the transition coupling 4 affixes the drill shaft 5 to the screw shaft 6 by being pressed down by compression springs 7. The nut-pusher 8 is screwed to the screw shaft 6 and is coupled with the links 9 by axles 10. The other ends of the links 9 are connected to moving jaws 12 by axles 11. Moving jaws 12 are pivotably mounted in shoulder screws 13. Shoulder screws 13 secure side guides 14 being tightened by nuts 15. Another end of moving jaws 12 is coupled with a cam follower 16 by pin 17. The cam follower 16 is pressed to the working portion of the bevel 81 located on the nut-pusher 8 by link 9 through the pin 11. The nut-pusher 8 is pressed upward by two springs 19. The clutch plate 20 is seated on the base 21 being pressed by compression springs 7 thru the transition coupling 4.

Referring now to FIG. 4, the stationary jaw unit is comprised of two stationary jaw spacers 23 located on the outside of the moving jaws 12 and a stationary jaw center 24 which is located inside moving jaws. Both stationary jaw spacers 23 and stationary jaw center 24 are mounted in the shoulder screws 13.

Figures 5A, 5B, 5C, 5D, 5E:
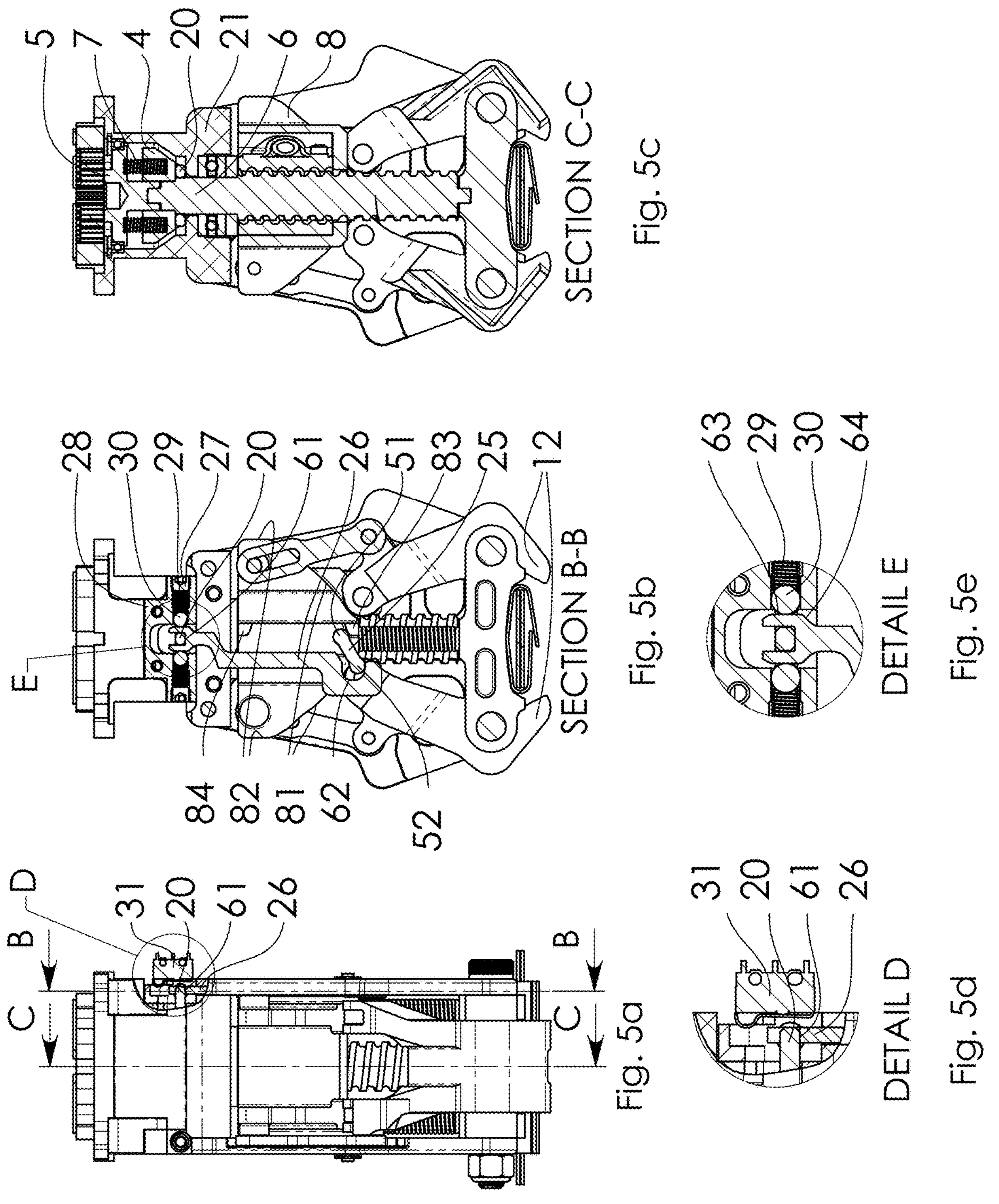
FIG. 5*a* is a front elevational view of the sealing assembly of the strapping tool of FIG. 1, wherein the powertrain and the battery pack are removed from sealing assembly.
FIG. 5*b* is a sectional view cut through the sealing assembly of the strapping tool of FIG. 1, which is cut along the cutting-plane line B-B in FIG. 5*a*, wherein the jaws of the strapping tool are depicted in an initial open state with a guide plate of the strapping tool removed for ease of illustration.
FIG. 5*c* is another sectional view cut through the sealing assembly of the strapping tool of FIG. 1, which is cut along the cutting-plane line C-C in FIG. 5*a*, wherein the jaws of the strapping tool are depicted in an initial open state with the guide plate of the strapping tool removed for case of illustration.
FIG. 5*d* is an enlarged partial sectional view of the end switch of the strapping tool depicted in FIG. 5*a* (Detail "D")
FIG. 5*e* is an enlarged partial sectional view of the upper end of the clutch lifter of the strapping tool depicted in FIG. 5*b* (Detail "E")

Referring now to FIGS. 4 and 5*b*, it can be seen that the protruded element 83 and the protruded element 84 are located on the nut-pusher 8. The clutch lever 25 is pivotally mounted on the side guide 14 and one of its ends 51 is in contact with the protruded element 83 of the nut-pusher 8, another end 52 is in contact with a lower end 62 of the clutch lifter 26. The upper end 61 of the clutch lifter 26 is in contact with the clutch plate 20. The screw 27 is mounted in the ball housing 28 and compresses the ball spring 29 pushing the ball 30 toward the vertical surfaces 63 of the clutch lifter 26. The ball is located a distance from the clutch lifter bevel 64. The end switch 31 is in the "ON" position.

FIGS. 5*a*-5*c*, 6*a*-6*c* and 7*a*-7*e* illustrate the operation of the sealer assembly 3 with an external power source 1. FIGS. 5*a*-5*e* depict the sealer assembly 3 in the initial state. The end switch 31 is in the "ON" position. In FIGS. 5*a*-5*c*, the working area of jaws 12 is open ready to receive straps with the seal. As shown in FIG. 5*b*, the clutch lifter 26 is in the lower position. And, as shown in FIG. 5*c*, the transition coupling 4 affixes the drill shaft 5 and is ready to transmit the torque from the external power source 1 to the sealer assembly 3. As shown in FIGS. 5*b* and 5*e*, the balls 30 are pressed to the vertical surfaces 63 of the clutch lifter 26 by springs 29. Now, an operator presses the trigger 41 of the external power source 1 sending power through the drill shaft 5 and transition coupling 4 to the screw-shaft 6, the screw-shaft 6 starts moving the nut-pusher 8, which forces jaws 12 through the cam followers 16 to pivot jaws 12 crimping the seal with the strap portions into the seal.

Figure 6C:
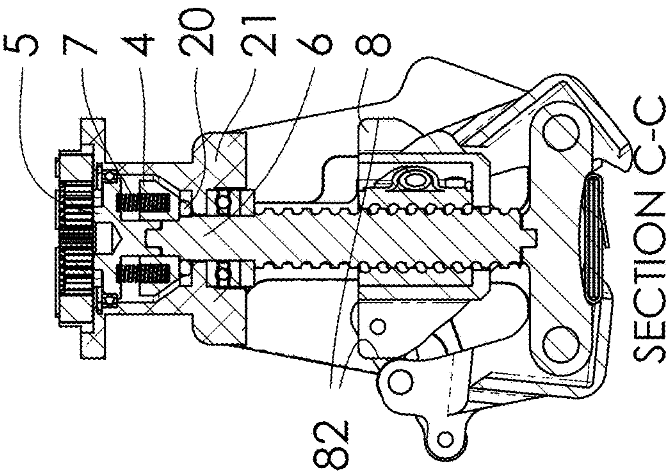
FIG. 6*c* is still another sectional view cut through the sealing assembly of the strapping tool of FIG. 1, which is cut along the cutting-plane line C-C in FIG. 6*a*, wherein the scaling assembly is depicted in the beginning of an uncoupling state with the guide plate of the strapping tool removed for ease of illustration.
Figure 6B:
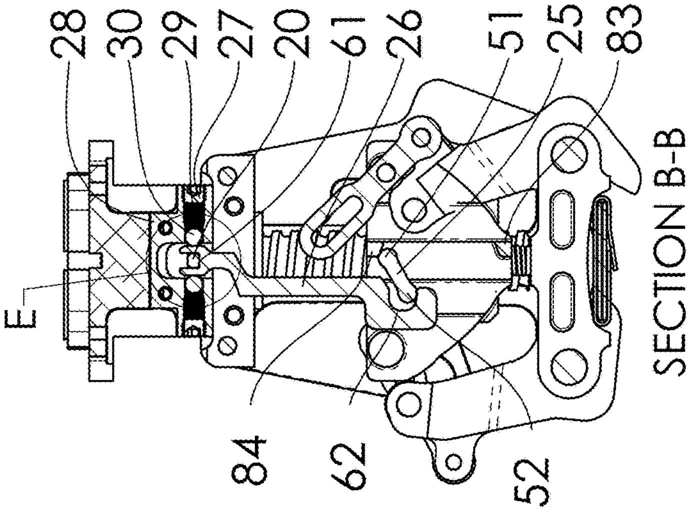
FIG. 6*b* is yet another sectional view cut through the sealing assembly of the strapping tool of FIG. 1, which is cut along the cutting-plane line B-B in FIG. 6*a*, wherein the scaling assembly is depicted in the beginning of an uncoupling state with a guide plate of the strapping tool removed for case of illustration.
Figure 6E:
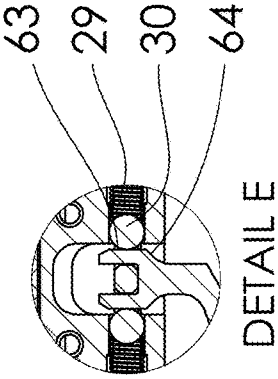
FIG. 6*e* is an enlarged partial sectional view of the upper end of the clutch lifter of the strapping tool depicted in FIG. 6*b* (Detail "E")
Figure 6A:
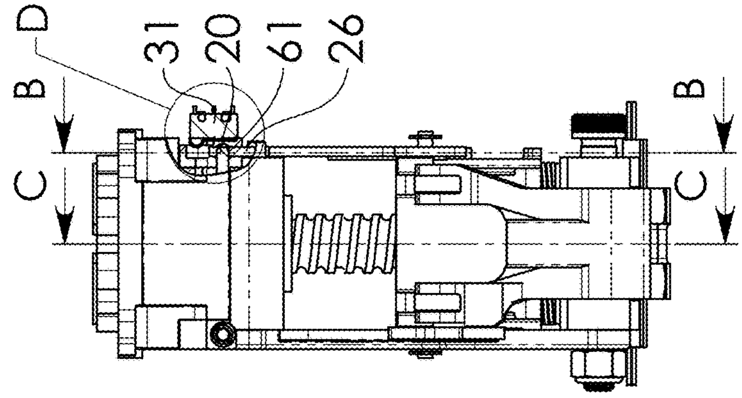
FIG. 6*a* is yet another front elevational view of the sealing assembly of the strapping tool of FIG. 1, wherein the powertrain and the battery pack are removed from the sealing assembly.
Figure 6D:
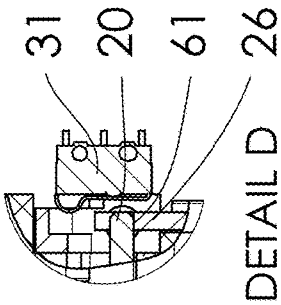
FIG. 6*d* is an enlarged partial sectional view of the end switch of the strapping tool depicted in FIG. 6*a* (Detail "D")

FIGS. 6*b*-6*e* illustrate the intermediate position of the sealer assembly 3. The end switch 31 is in the "ON" position. The working area of jaws 12 is closed and the strap portion with the seal are crimped. The transition coupling 4 affixes the drill shaft 5 and still transmits the torque and rotation from an external power source 1 to the sealer assembly 3. The cam followers 16 are no longer in the contact with the working portion of the bevel 81. The cam followers 16 are now in contact with the idle portion of the bevel 82 (see FIG. 6*c*) and further movement of the nut-pusher 8 does not pivot jaws 12. As shown in FIG. 6*b*, the protruded element 84 approached the end 51 of the clutch lever 25. The further movement of the nut-pusher 8 down will lead to rotation of the clutch lever 25 with the other end 52 of the clutch lever 25 lifting the clutch lifter 26 along with the clutch plate 20 and transition coupling 4 uncoupling the screw shaft 6 from the drill shaft 5.

Figures 7A, 7B, 7C, 7D, 7E:
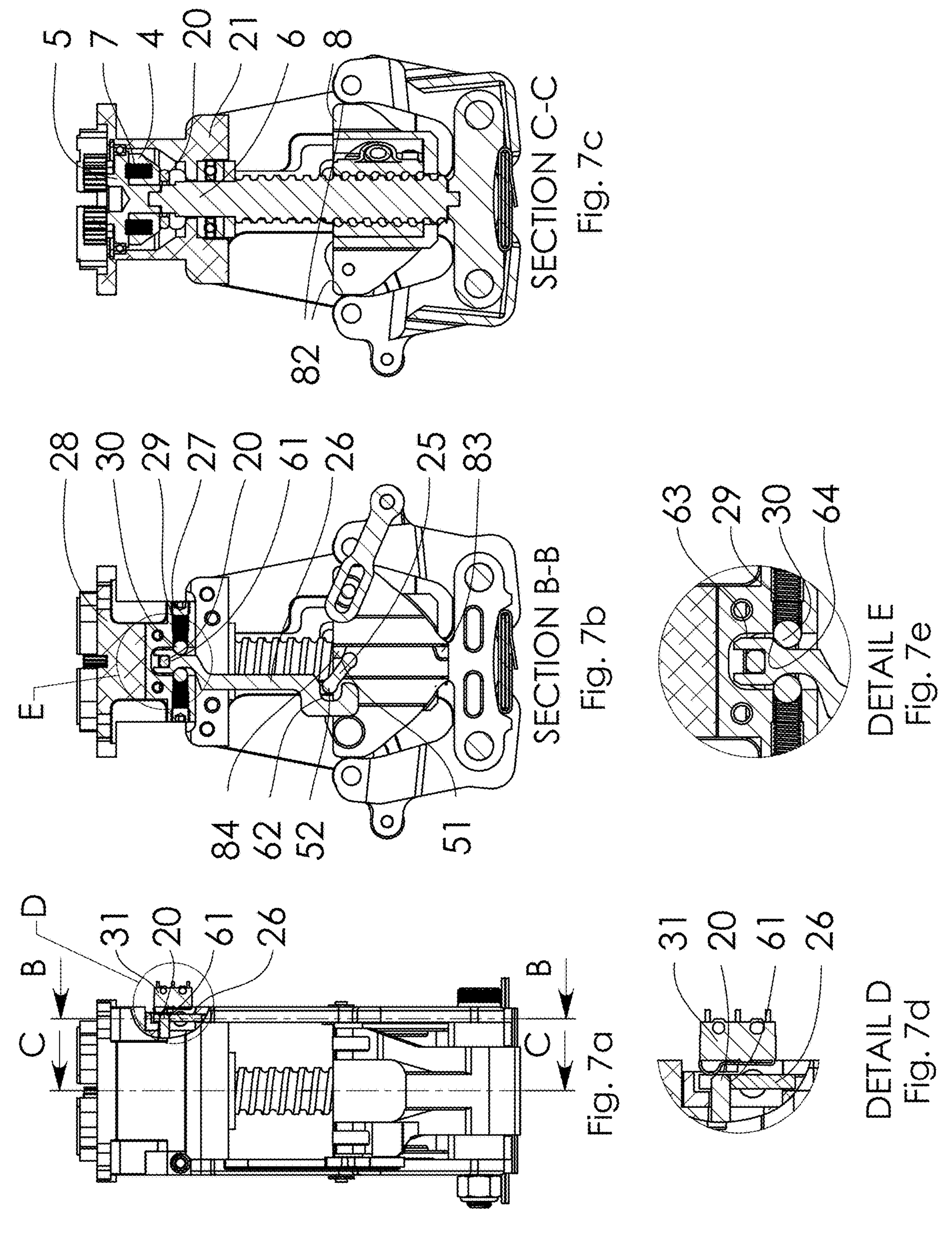
FIG. 7*a* is still another front elevational view of the sealing assembly of the strapping tool of FIG. 1, wherein the powertrain and the battery pack are removed from sealing assembly.
FIG. 7*b* is yet another sectional view cut through the sealing assembly of the strapping tool of FIG. 1, which is cut along the cutting-plane line B-B in FIG. 7*a*, wherein the sealing assembly is depicted in a crimped state in which the returning of the nut-pusher to the initial position begins, and a guide plate of the strapping tool has been removed for ease of illustration.
FIG. 7*c* is still another sectional view cut through the sealing assembly of the strapping tool of FIG. 1, which is cut along the cutting-plane line C-C in FIG. 7*a*, wherein the sealing assembly is depicted in a crimped state in which the returning of the nut-pusher to the initial position begins, and the guide plate of the strapping tool has been removed for ease of illustration.
FIG. 7*d* is an enlarged partial sectional view of the end switch of the strapping tool depicted in FIG. 7*a* (Detail "D")
FIG. 7*e* is an enlarged partial sectional view of the upper end of the clutch lifter of the strapping tool depicted in FIG. 7*b* (Detail "E")
Figure 8:
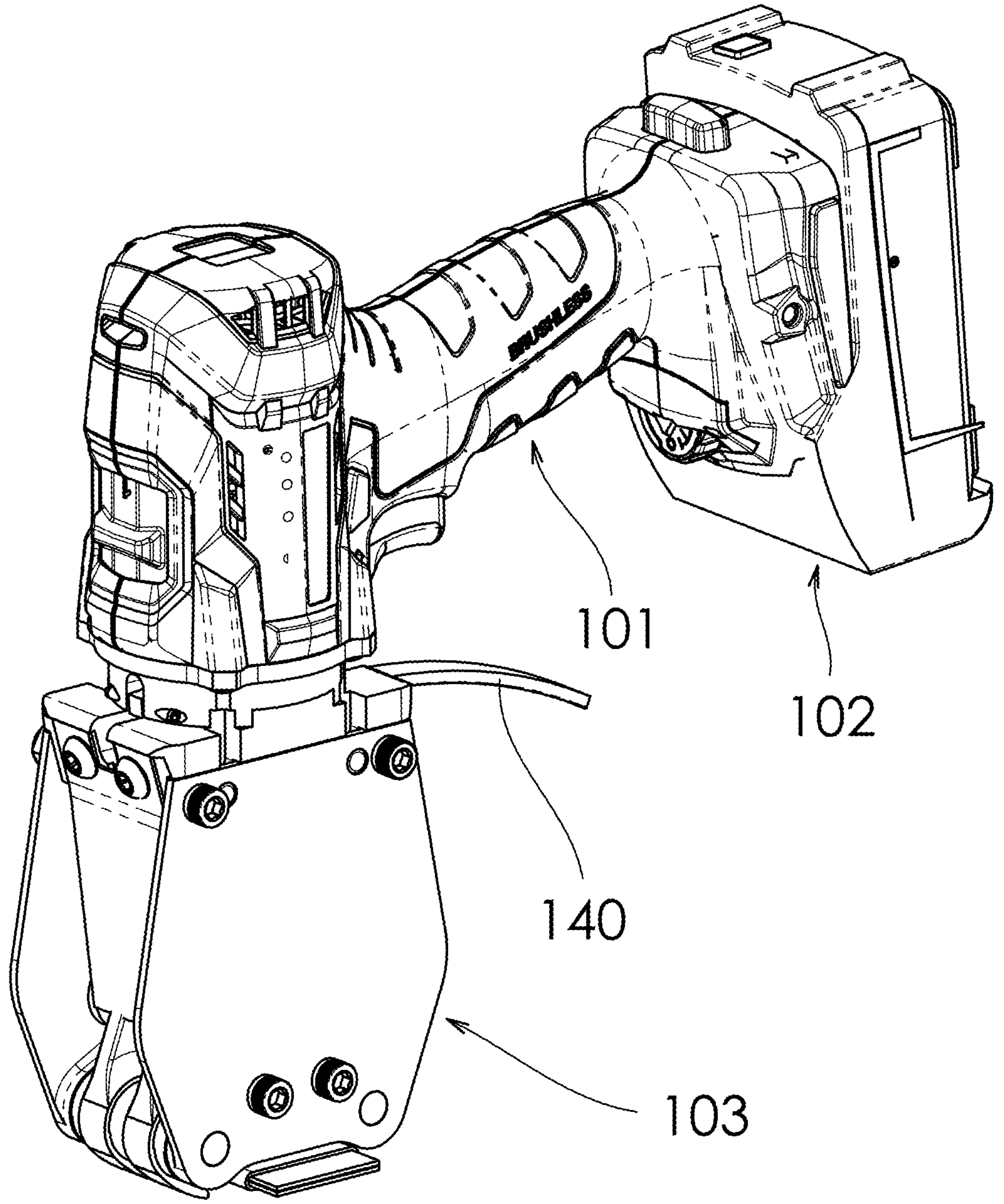
FIG. 8 is a perspective view of a strapping tool, according to a second illustrative embodiment of the invention.
Figure 9A:
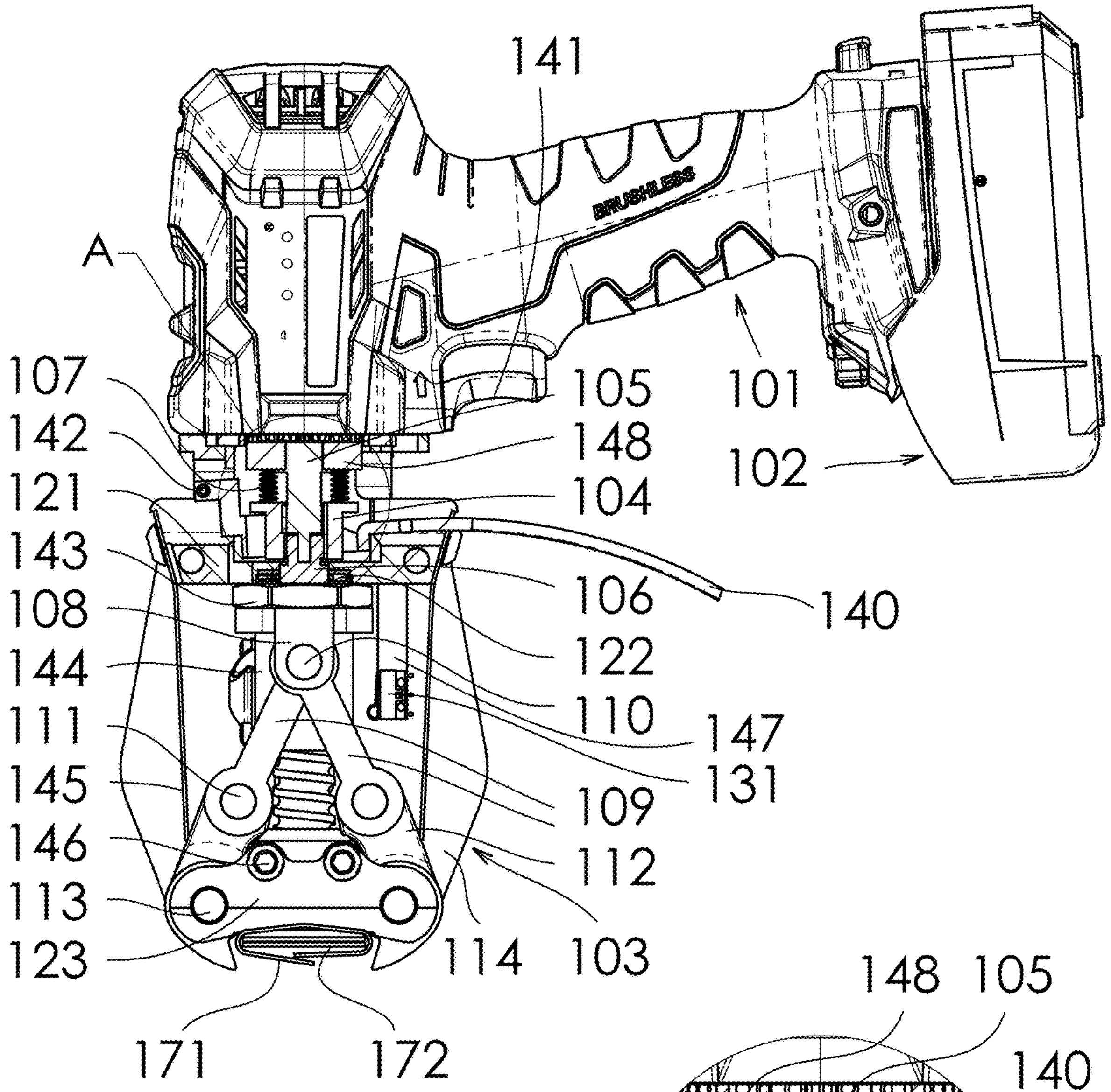
FIG. 9*a* is a side elevational view of the strapping tool of FIG. 8, wherein the jaws of the strapping tool are depicted in an initial open state with a guide plate of the strapping tool removed for ease of illustration.
Figure 9B:
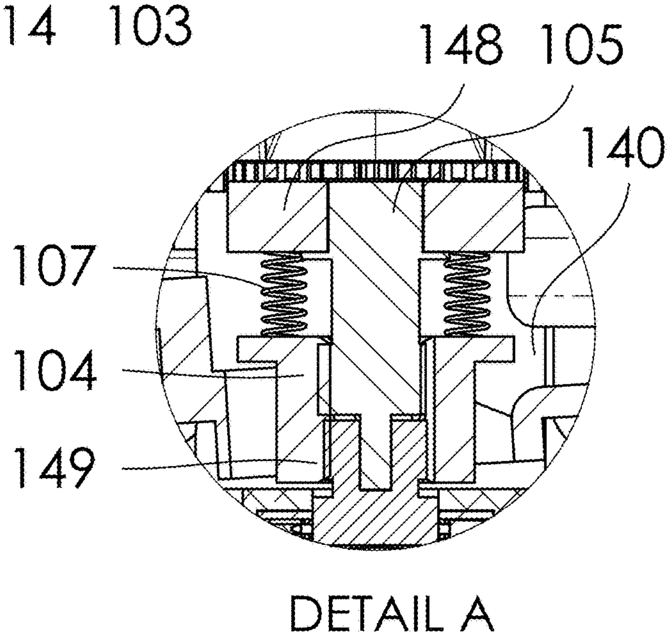
FIG. 9*b* is an enlarged partial side view of an engaged position of the transitional coupling of the strapping tool depicted in FIG. 9*a;*
Figure 10:
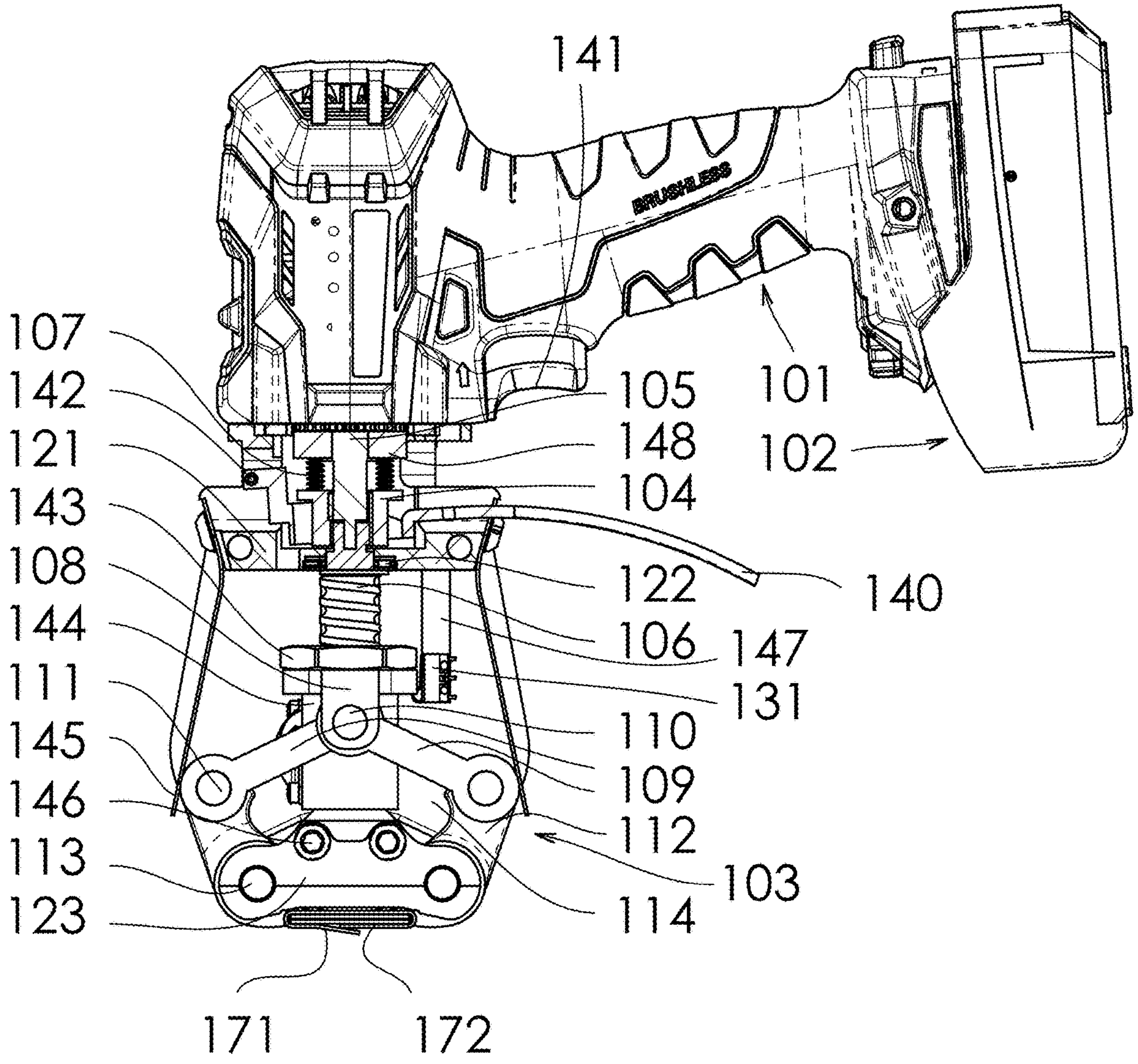
FIG. 10 is another side elevational view of the strapping tool of FIG. 8, wherein the jaws of the strapping tool are depicted in a closed state for crimping or notching the seal member with a guide plate of the strapping tool removed for ease of illustration.
Figure 11A:
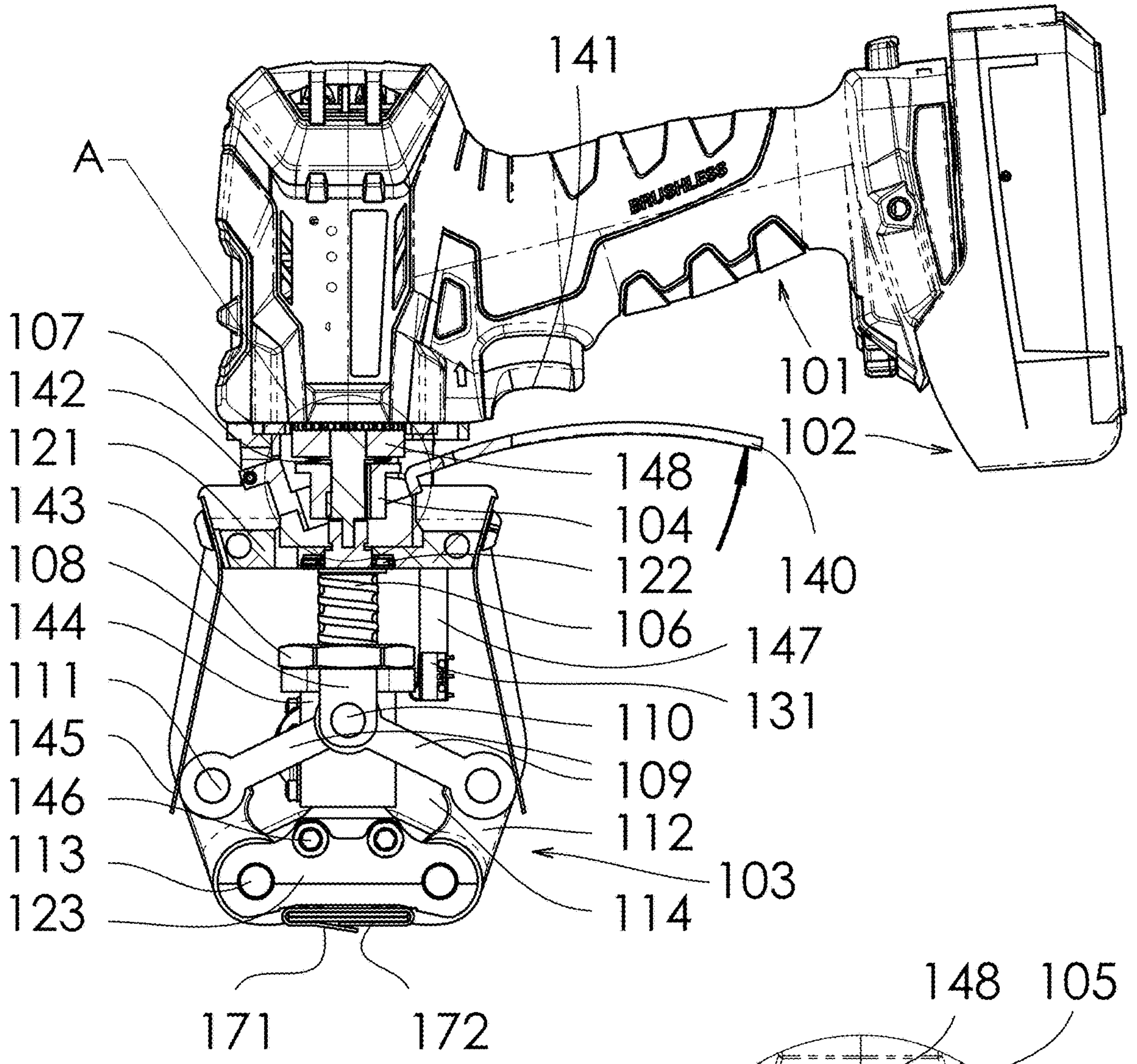
FIG. 11*a* is yet another side elevational view of the strapping tool of FIG. 8, wherein the jaws of the strapping tool are depicted in a closed state for crimping or notching the seal member with the guide plate of the strapping tool removed for ease of illustration, and a force is shown being applied to the handle.
Figure 11B:
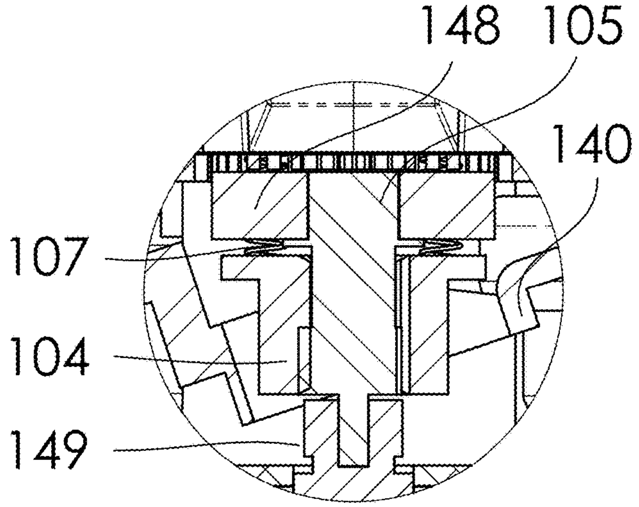
FIG. 11*b* is an enlarged partial side sectional view of a disengaged position of the transitional coupling of the strapping tool depicted in FIG. 11*a* (Detail "A")
Figure 12:
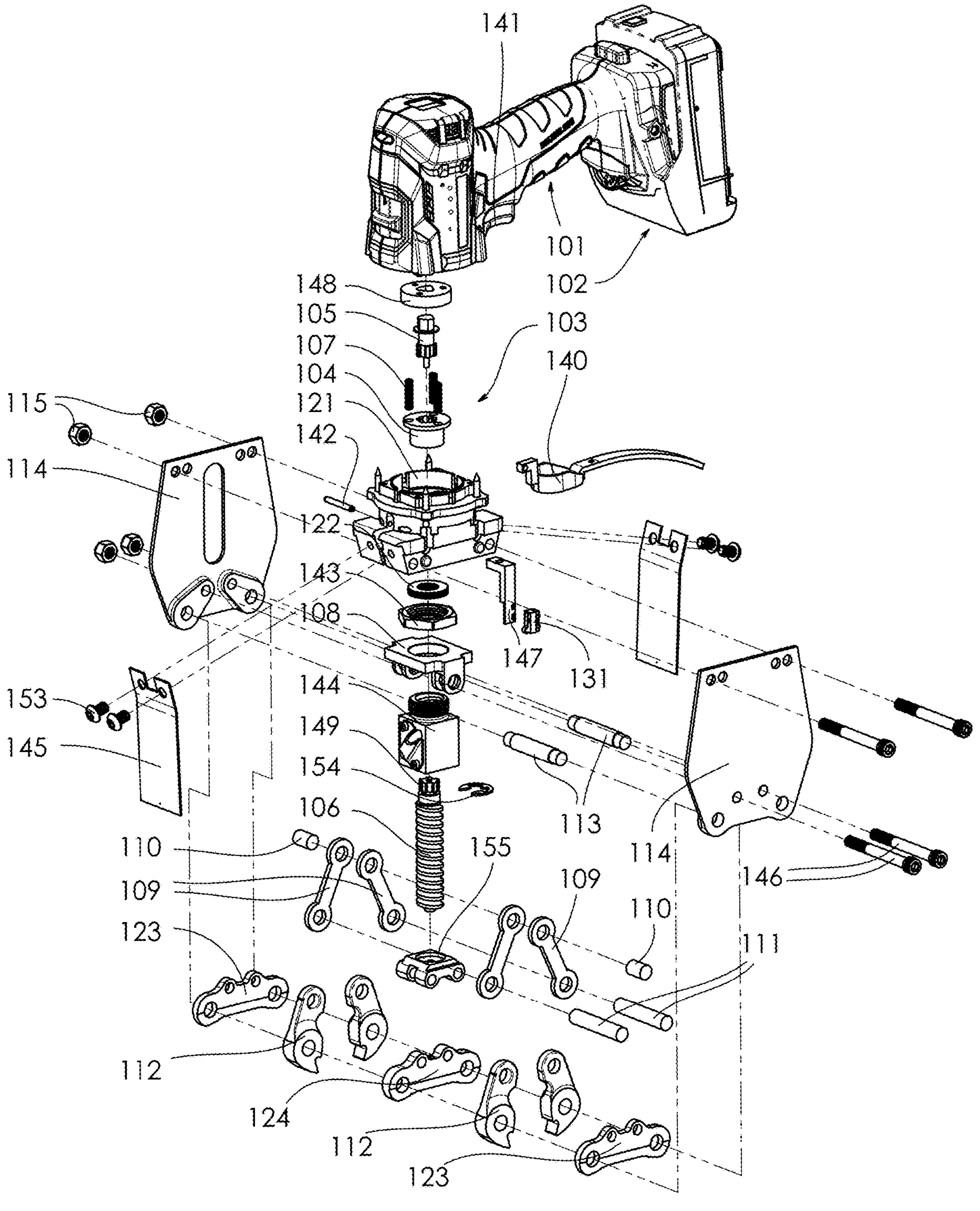
FIG. 12 is an exploded perspective view of the strapping tool of FIG. 8.

Referring now to FIGS. 6*b*, 6*c* and 6*c*, the rotation of the screw shaft 6 is possible only when the transition coupling 4 is coupling the drill shaft 5 to the screw shaft 6. In FIGS. 7*b* and 7*e* is shown the final position of the nut-pusher 8 in which balls 30 being pushed by springs 29 are in contact with the bevels 64 of the clutch lifter 26. This makes possible the further movement of the clutch lifter 26 upward, completely disengaging the screw shaft 6 from the drill shaft 5 and therefore the sealer assembly 3 from the external power source 1. The screw shaft 6 is set free now. In this state, the end switch 31 is in the "OFF" position being turned off by the clutch plate 20. An operator can now release the trigger 41 of an external power source 1.

Returning now to FIG. 3, the spring 19 is in a compressed condition and it starts to move the nut-pusher 8 upward rotating the free screw shaft 6. In the final stage of this movement, the protruded element 83 pushes the end 51 of the clutch lever 25 forcing the other end 52 of the clutch lever 25 to move the clutch lifter 26 down releasing the transition coupling 4 so that the coupling 4 moves down and rotatably couples the drill shaft 5 to the screw shaft 6 being pressed down by compression springs 7 and turning the end switch 31 to the "ON" position. Now, the crimp-type sealer 3 is in initial state and is ready for the next cycle.

A second illustrative embodiment of a strapping tool is illustrated in FIGS. 8-12. Referring to these figures, it can be seen that, in many respects, the second illustrative embodiment of the strapping tool is similar to that of the first illustrative embodiment. Moreover, many elements are common to both such embodiments. For the sake of brevity, the elements that the second embodiment of the strapping tool has in common with the first embodiment will not be discussed because these components have already been described above.

The first illustrative embodiment described above utilizes a ramp-like working bevel portion 81 of the nut-pusher 8 to provide actuation of the jaws 12 via a ball nut 8 and ball screw 6. In the first illustrative embodiment, the drive mechanism is an automatic coupling release from the motor and drive screw at the end of the crimping operation. The second illustrative embodiment described hereinafter utilizes jaws 112, links 109, and a pin system 110, 111, 113 to provide actuation of the jaws 112. The second illustrative embodiment still implements ball screw 106 and ball nut 144 components. However, the use of leaf springs 145 mounted to the frame 121 and biased against the jaw 112 provides the necessary force to return the mechanism. The drive and release operation with this second illustrative embodiment is manual in nature. In this embodiment, the drive mechanism is manually disengaged by the operator via a release handle 140. At the end of the crimping cycle, the operator lifts the handle which releases the connection between the splined shafts.

The drive and release mechanism includes two splined and opposing shafts, a handle 140, and a compression spring 107. One shaft 105 is directly driven by the motor of the drill 101. The second splined shaft is a ball screw 106 that is connected to the crimping components through a ball nut 144. Between the two shafts is a splined coupling 104. In the drive position (refer to Detail "A", FIG. 9*b*), the coupling 104 spans over both shafts 105, 106. In this position, the first and second shafts 105, 106 are held together and driven as one unit. At the end of the crimping operation, the operator lifts the handle 140 which slides the coupling 104 from the first splined shaft 105 which disengages the two shafts 105, 106 and allows the second shaft 106 to rotate freely and independently (see Detail "A", FIG. 11*b*). The crimping mechanism returns to the home position (i.e., the position where the jaws 112 are opened). Releasing the handle 140 allows the coupling 104 to slide to the original position facilitated by a spring 107 positioned above the coupling 104.

To operate the strapping tool of the second illustrative embodiment, the user pulls and holds the trigger 141 of the attached drill 101 until the motor stalls. The user then releases the drill trigger 141 and lifts the handle 140 attached to the sealing assembly 103. The crimping mechanism automatically returns to home position.

As such, the second illustrative embodiment utilizes independent drive shafts 105, 106 that are held in rotation via a sliding coupling mechanism 104. The coupling 104 can then be moved from the drive position (i.e., FIG. 9*b* position) to a position (i.e., FIG. 11*b* position) that uncouples and releases the shafts 105, 106 and allows them to move independently.

Figure 13A:
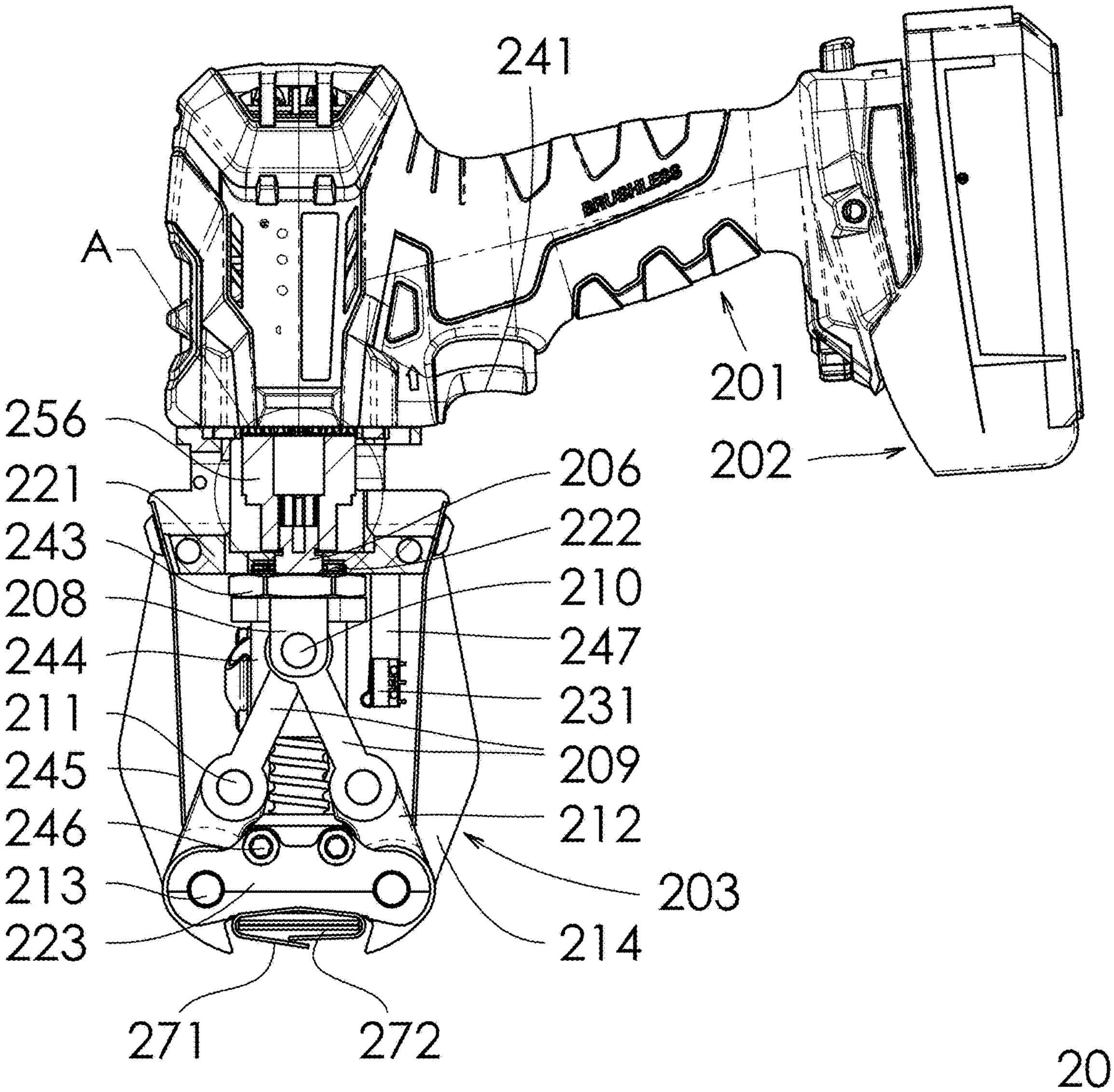
FIG. 13*a* is a side elevational view of a strapping tool, according to a third illustrative embodiment of the invention, wherein the jaws of the strapping tool are depicted in an initial open state with a guide plate of the strapping tool removed for ease of illustration.
Figure 13B:
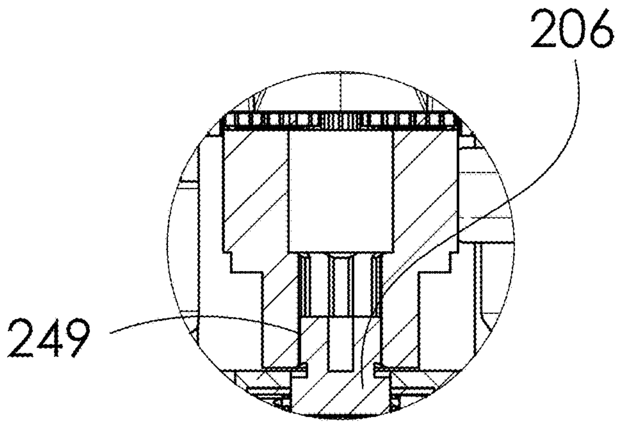
FIG. 13*b* is an enlarged partial side sectional view of the direct drive shaft coupling the drill shaft to the screw shaft of the strapping tool depicted in FIG. 13*a* (Detail "A")
Figure 14A:
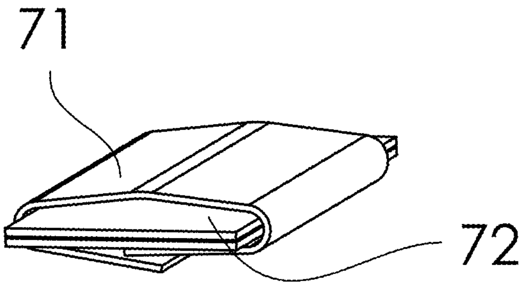
FIG. 14*a* is a perspective view of a sealing member and strap in an initial state prior to crimping or notching.
Figure 14B:
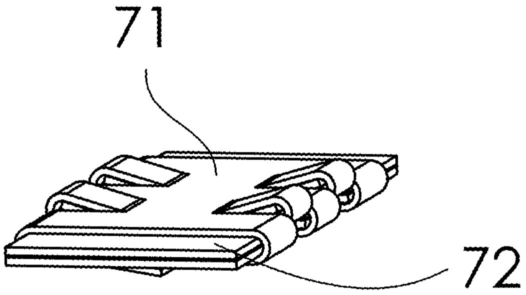
FIG. 14*b* is a perspective view of the sealing member and strap of FIG. 14*a* in a subsequent state after the sealing member and strap has been crimped or notched.

A third illustrative embodiment of a strapping tool is illustrated in FIGS. 13*a* and 13*b*. Referring to these figures, it can be seen that, in many respects, the third illustrative embodiment of the strapping tool is similar to that of the preceding two illustrative embodiments. Moreover, many elements are common to all of the embodiments. For the sake of brevity, the elements that the third embodiment of the strapping tool has in common with the first and second embodiments will not be discussed because these components have already been described above.

Unlike the first and second embodiments described above, the third illustrative embodiment, utilizes a direct drive shaft coupling 256 to rotatably couple the drill shaft to the upper end of the screw shaft 206 with splined element 249. In the third embodiment, the drill motor drives the central screw shaft 206 with the screw thread which, in turn, displaces the ball-nut 244 and powers the jaws 212 both up and down. The screw shaft 206 with splined element 249 is always rotationally coupled to the drill shaft by means of the shaft coupling 256 in the third embodiment. The mechanism for powering the jaws 212 may be a ball screw or a low torque ball screw bearing. To control the reversal operation of the motor, either one or more internal torque sensors on the motor control board may be used to measure the screw torque or external position sensors with limit switches may be used to indicate the location of the ball-nut (e.g., the ball-nut 244 is displaced to a position where the ball-nut 244 contact a limit switch or position switch to indicate a point where reversal of the motor is to commence). As shown in FIG. 13*a*, the jaws 212 that crimp or notch the seal 271 may be connected to the ball-nut 244 via the link frame 208 and the links 209. Other parts of the strapping tool depicted in FIG. 13*a* are used for structural support (e.g., the base 221) and pivoting of the jaws 212 (e.g., link axle 210, axle 211, and main axle 213) to accomplish the force connections and movement. The guiding of the moving components of the strapping tool is accomplished by the structural supports and side guides 214.

As such, the third illustrative embodiment of the strapping tool uses a powered return instead of the unpowered return utilized in the first two embodiments. In the third illustrative embodiment, one or more electronic switches are used in place of the clutch mechanism for the return functionality of the jaws 212. The one or more electronic switches enable the jaws 212 to be opened without the use of a printed circuit board (PCB). In the first two embodiments, the return of the jaws is unpowered. The strapping tool of the first embodiment uses a plurality of links to perform the unpowered return functionality automatically, while the strapping tool of the second embodiment uses a manual handle 140 to disengage the transitional coupling 104, which operates like a clutch. In contrast, the third illustrative embodiment does not use any type of clutch mechanism that disengages the motor from the sealer assembly, but rather uses one or more electronic switches (e.g., a series of switches) that results in the reversing of the motor without requiring a printed circuit board for the reversal operation. Eliminating the printed circuit board for the reversal operation, and the space the board requires, results in the strapping tool of the third embodiment providing significant advantages over conventional tool designs because it makes the strapping tool simpler and smaller in size.

Brushless motors used in modern tools typically need a power supply board. The power supply board changes the poles on the motor, which changes polarity and makes the motor spin. In the third illustrative embodiment, the strapping tool still needs the power supply board, but the tool does not need a separate printed circuit board (PCB). In one or more versions of the third embodiment, a combined power supply board and PCB may be provided so as to result in an integrated power supply board and PCB.

Now, the operation of the third illustrative embodiment of the strapping tool will be described with reference to FIGS. 13*a* and 13*b*. First, the operator of the strapping tool presses the drill trigger 241, and releases the trigger 241. In response to pressing and releasing of the drill trigger 241, the strapping tool rotates the screw shaft 206, which displaces the ball-nut 244 and lowers the jaw stack and notches the seal 271. Then, a mechanical component contacts switch 231, and the switch 231 cuts power, then reverses the rotational direction of the motor. With the rotational direction of the motor reversed, the tool power source now returns the ball nut and jaw stack to the original upper/open position. At the top position, either a switch is hit which cuts power, or a mechanical stop is hit, which shuts down the motor drive on the drill.

The following is a list of reference characters that are utilized in the drawings of this application together with the components that they are used to represent:

1 External power source
2 Battery pack
3 Sealer Assembly
4 Transition coupling
5 Drill shaft
6 Screw shaft
7 Compressing springs
8 Nut-pusher
9 Link
10 Link axle
11 Axle
12 Moving jaw
13 Shoulder screw
14 Side guide
15 Nut
16 Cam follower
17 Pin
18 Washer
19 Spring
20 Clutch plate
21 Base
22 Thrust bearing
23 Stationary jaw spacer
24 Stationary jaw center
25 Clutch lever
26 Clutch lifter
27 Screw
28 Ball housing
29 Ball spring
30 Ball
31 End switch
41 Drill trigger
51 First end of clutch lever
52 Second end of clutch lever
61 Upper end of the clutch lifter
62 Lower end of the clutch lifter
63 Vertical surfaces of the clutch lifter
64 Bevel of the clutch lifter
71 Strapping seal member
72 Strap
81 Working bevel portion of nut-pusher
82 Idle bevel portion of nut-pusher
83 First protruded element of the nut-pusher
84 Second protruded element of the nut-pusher
101 External power source
102 Battery pack
103 Sealer Assembly
104 Transition coupling
105 Drill shaft
106 Screw shaft
107 Compressing springs
108 Link frame-double support
109 Link
110 Link axle
111 Axle
112 Moving jaw
113 Main axle
114 Side guide
115 Nut
121 Base
122 Thrust bearing
123 Stationary jaw spacer
124 Stationary jaw center
131 End switch
140 Handle
141 Trigger
142 Dowel pin
143 Nut
144 Ball-nut
145 Leaf spring
146 Screw
147 Switch mount
148 Drive Plate
149 Spline element of the screw shaft
153 Screw
154 Retaining ring
155 Center jaw spacer-double thrust bearing
171 Strapping seal member
172 Strap
201 External power source
202 Battery pack
203 Sealer Assembly
206 Screw shaft
208 Link frame-double support
209 Link
210 Link axle
211 Axle
212 Moving jaw
213 Main Axle
214 Side guide
221 Base
222 Thrust bearing
223 Stationary jaw spacer
231 Limit switch
241 Trigger
243 Nut
244 Ball-nut
245 Leaf spring
246 Screw
247 Switch mount
249 Spline element of the screw shaft
256 Direct drive shaft
271 Strapping seal member
272 Strap The aforedescribed embodiments of the invention utilize various external power sources for a variety of different strapping sealer tools. In addition to the compressed air and battery power sources described with regard to the preceding embodiments, the motive power for the external power source of the sealer tools could also be electricity from the grid, a fuel cell-based chemical source, or another chemical-based source, such as a gasoline-driven motor or internal combustion engine (as well as any other suitable motive power). The external power source converts the energy source into a mechanical motion that is further converted into energy that is useful to the packaging industry. By adding an intermediate energy conversion device, a very practical energy conversion is possible. This conversion can be made more reliable, more efficient, more flexible, more interchangeable, more convertible, and easier by using this invention. Power supplies can be swapped out for units that are broken. They can be swapped out for units that need a different energy source. They can even be swapped out if more precision, or more or less power is needed. As such, the invention greatly advances the technology of the packaging industry.

It is readily apparent that the aforedescribed embodiments of the strapping tool offer numerous advantages. The strapping tools described herein are lighter, smaller in size, and simpler in design than conventional tools used to crimp or notch the seals on steel or poly strapping systems. The abovedescribed strapping tools may use a packaged drill as the external power source, and modify the operation of the drill controls to perform the strap sealing operation in a novel manner.

Although the invention has been shown and described with respect to a certain embodiment, it is apparent that this invention can be embodied in many different forms and that many other modifications and variations are possible without departing from the spirit and scope of this invention.

Moreover, any of the features or attributes of the above-described embodiments and variations can be used in combination with any of the other features and attributes of the above-described embodiments and variations as desired.

Furthermore, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A strapping tool, comprising:

an external power source;

a drivetrain assembly operatively coupled to the external power source and comprising a rotatable screw shaft coupled to a direct drive coupling and threadingly engaged with a nut-pusher component;

a sealing assembly, the sealing assembly comprising at least one jaw member, the drivetrain assembly operatively coupling the at least one jaw member to the external power source, and the at least one jaw member of the sealing assembly configured to crimp or notch a strapping seal member and/or strapping so as to secure a piece of strapping around a package or bundle of items; and a control board configured to control operation of the external power source;

wherein the drivetrain assembly is configured to return the at least one jaw member to an open position without sending or receiving a control signal to or from the control board.

2. The strapping tool according to claim 1, wherein the external power source comprises an electric drill.

3. The strapping tool according to claim 1, wherein the external power source is battery-powered.

4. The strapping tool according to claim 3, wherein the external power source comprises a battery-powered electric drill.

5. The strapping tool according to claim 4, wherein the control board is a printed circuit board configured to control operation of the battery-powered electric drill.

6. The strapping tool according to claim 1, wherein the sealing assembly further comprises:

at least one linkage member coupling the at least one jaw member to the nut-pusher component by means of a linkage frame member;

wherein the drivetrain assembly is configured to return the at least one jaw member to the open position when a motor of the external power source is reversed based upon a signal outputted by a torque sensing device or position sensing device.

7. The strapping tool according to claim 6, wherein the torque sensing device is a torque sensor configured to detect the torque outputted by the motor, or the position sensing device is a position switch or limit switch configured to detect the position of a component of the sealing assembly.

8. A strapping tool, comprising:

an external power source with a motor;

a drivetrain assembly operatively coupled to the external power source;

a power motor control board configured to control the motor of the external power source;

a sealing assembly, the sealing assembly comprising at least one jaw member, the drivetrain assembly operatively coupling the at least one jaw member to the external power source, and the at least one jaw member of the sealing assembly configured to crimp or notch a strapping seal member and/or strapping so as to secure a piece of strapping around a package or bundle of items; and a sensing device configured to detect a torque outputted by the motor and output a signal based on the detected torque;

wherein the power motor control board is configured to reverse a rotational direction of the motor based upon the signal outputted by the sensing device so as to return the at least one jaw member to an open position.

9. The strapping tool according to claim 8, wherein the sensing device is a torque sensor configured to detect the torque outputted by the motor.

10. The strapping tool according to claim 8, wherein the at least one jaw member is configured to return to the open position by being driven by the motor of the external power source.

* * * * *